United States Patent
Song et al.

(10) Patent No.: US 12,055,625 B2
(45) Date of Patent: Aug. 6, 2024

(54) RADAR SIGNAL PROCESSING METHOD AND APPARATUS, AND STORAGE MEDIUM

(71) Applicant: HUAWEI TECHNOLOGIES CO., LTD., Shenzhen (CN)

(72) Inventors: Sida Song, Beijing (CN); Sha Ma, Beijing (CN); Lutao Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 589 days.

(21) Appl. No.: 17/218,534

(22) Filed: Mar. 31, 2021

(65) Prior Publication Data

US 2021/0215822 A1 Jul. 15, 2021

Related U.S. Application Data

(63) Continuation of application No. PCT/CN2019/112033, filed on Oct. 18, 2019.

(30) Foreign Application Priority Data

Oct. 25, 2018 (CN) .......................... 201811252196.8

(51) Int. Cl.
  *G01S 13/931* (2020.01)
  *G01S 7/02* (2006.01)
  *G01S 7/35* (2006.01)
  *G01S 13/72* (2006.01)

(52) U.S. Cl.
  CPC ............ *G01S 13/931* (2013.01); *G01S 7/024* (2013.01); *G01S 7/352* (2013.01); *G01S 13/72* (2013.01)

(58) Field of Classification Search
  CPC .... G01S 7/28; G01S 7/35; G01S 2013/93272; G01S 7/0231; G01S 2013/93271; G01S 2013/93274; G01S 2013/9321; G01S 13/72; G01S 2013/9315; G01S 7/352; G01S 13/87; G01S 7/024; G01S 7/021; G01S 13/931; G01S 7/931; G01S 7/87; B60W 2420/52; B60W 40/02
  USPC .......................................................... 342/70
  See application file for complete search history.

(56) References Cited

U.S. PATENT DOCUMENTS

| 2007/0159380 A1 | 7/2007 | Nagaishi et al. |
| 2009/0072957 A1 | 3/2009 | Wu et al. |
| 2016/0047907 A1* | 2/2016 | Izadian ................ H01Q 3/2605 342/368 |

(Continued)

FOREIGN PATENT DOCUMENTS

| CN | 102053245 A | 5/2011 |
| CN | 102680979 A | 9/2012 |

(Continued)

*Primary Examiner* — Vladimir Magloire
*Assistant Examiner* — Remash R Guyah
(74) *Attorney, Agent, or Firm* — Maier & Maier, PLLC

(57) ABSTRACT

A radar signal processing method and an apparatus, and a storage medium that are applied to a first radar. The method includes: determining that a polarization direction of the first radar is a first angle, where the first radar is located at a first vehicle; and transmitting a radar signal based on the polarization direction of the first radar, where a detection direction of the first radar is opposite to a detection direction of a second radar located at the first vehicle, and a polarization direction of the second radar is a second angle; and the first angle and the second angle are orthogonal.

20 Claims, 10 Drawing Sheets

(56) References Cited

U.S. PATENT DOCUMENTS

2017/0299708 A1* 10/2017 Cho .................. G01S 7/038

FOREIGN PATENT DOCUMENTS

| CN | 104345309 A | | 2/2015 |
|----|-------------|---|--------|
| CN | 108363059 A | | 8/2018 |
| JP | 2015059822 A | * | 3/2015 |
| WO | 2018139016 A1 | | 8/2018 |

* cited by examiner

RADAR SIGNAL PROCESSING METHOD AND APPARATUS, AND STORAGE MEDIUM

CROSS-REFERENCE TO RELATED APPLICATIONS

This application is a continuation International Application No. PCT/CN2019/112033, filed on Oct. 18, 2019, which claims priority to Chinese Patent Application No. 201811252196.8, filed on Oct. 25, 2018. The disclosures of the aforementioned applications are hereby incorporated by reference in their entireties.

TECHNICAL FIELD

Embodiments relate to radar technologies, and in particular, to a radar signal processing method and an apparatus, and a storage medium.

BACKGROUND

In an advanced driver assistant system (ADAS), an in-vehicle radar is used as an important sensor to detect targets, such as a pedestrian and a vehicle, around a vehicle. Specifically, a transmitter of the in-vehicle radar generates an electromagnetic wave, and directionally radiates the electromagnetic wave by using an antenna. The target scatters the intercepted electromagnetic wave in various directions, and some scattered electromagnetic waves thereof (that is, a target echo signal) are in a receiving direction of the in-vehicle radar. The in-vehicle radar collects some scattered electromagnetic waves by using the antenna and feeds back the scattered electromagnetic waves to a receiver of the in-vehicle radar. The receiver performs signal processing, such as amplification, on the some scattered electromagnetic waves to obtain target detection information. Then the in-vehicle radar uses the target detection information as an input and transmits the target detection information to a processing module related to unmanned driving, for implementation of a subsequent function of unmanned driving.

In the foregoing target detection process, the in-vehicle radar detects the target based on the target echo signal (two-way). If an interference signal interfering with the in-vehicle radar is directly transmitted to the receiver (one-way), because a path loss difference is caused by a distance difference between the target echo signal and the interference signal, and a loss of reflected energy of the target is caused by a radar cross section (RCS) that reflects a scattering characteristic of the target, the interference signal received by the receiver is far greater than the target echo signal. To ensure a detection distance and detection precision of the in-vehicle radar, a signal-to-noise ratio at the receiver needs to be kept at a specific level. Therefore, how to keep the signal-to-noise ratio at the receiver at the specific level is most important.

In addition, as in-vehicle radar penetration rate increases, mutual interference between in-vehicle radars is increasingly severe. A decrease of the signal-to-noise ratio at the receiver will greatly reduce a detection probability of the in-vehicle radar or increase a false alarm probability of the in-vehicle radar. This considerably affects security or comfort. Therefore, mutual interference between in-vehicle radars needs to be reduced.

SUMMARY

Embodiments provide a radar signal processing method and an apparatus, and a storage medium, to reduce mutual interference between in-vehicle radars.

According to a first aspect, an embodiment provides a radar signal processing method, applied to a first radar. The radar signal processing method includes: determining that a polarization direction of the first radar is a first angle, where the first radar is located at a first vehicle: and transmitting a radar signal based on the polarization direction of the first radar. A detection direction of the first radar is opposite to a detection direction of a second radar located at the first vehicle. A polarization direction of the second radar is a second angle. The first angle and the second angle are orthogonal.

Optionally, the first angle is 0 degrees or 90 degrees. Corresponding to the first angle, when the first angle is 0 degrees, the second angle is 90 degrees: or when the first angle is 90 degrees, the second angle is 0 degrees.

In the foregoing embodiment, it is first determined that the polarization direction of the first radar is the first angle, and then the radar signal is transmitted based on the polarization direction of the first radar. The detection direction of the first radar is opposite to the detection direction of the second radar located at the first vehicle, the polarization direction of the second radar is the second angle, and the first angle and the second angle are orthogonal. Because the first angle and the second angle are orthogonal, mutual interference between in-vehicle radars can be effectively reduced.

In a possible implementation, the detection directions of the first radar and the second radar are, respectively, a forward direction and a backward direction of a heading direction of the first vehicle.

Further, the first vehicle further includes a third radar and a fourth radar, and polarization directions of the third radar and the fourth radar are a third angle. Optionally, the third angle is 45 degrees or −45 degrees.

Optionally, detection directions of the third radar and the fourth radar are, respectively, a left direction and a right direction that are orthogonal to the heading direction of the first vehicle.

In another possible implementation, the detection direction of the first radar is a left direction orthogonal to a heading direction of the first vehicle, and the detection direction of the second radar is a right direction orthogonal to the heading direction of the first vehicle: or the detection direction of the first radar is a right direction orthogonal to a heading direction of the first vehicle, and the detection direction of the second radar is a left direction orthogonal to the heading direction of the first vehicle.

In this possible implementation, further, the determining that a polarization direction of the first radar is a first angle may include: determining, based on a first signal, that the polarization direction of the first radar is the first angle. A quantity of times the first signal is consecutively received within a predetermined time is not less than a predetermined quantity of times, and a polarization direction of the first signal is the first angle or the second angle.

Optionally, before the determining that a polarization direction of the first radar is a first angle, the radar signal processing method may further include: configuring the first radar to alternately transmit a radar signal by using the first angle and the second angle as polarization directions, until the first signal is consecutively received for the predetermined quantity of times within the predetermined time.

In this embodiment, the first radar is first configured to alternately transmit a radar signal by using the first angle and the second angle as the polarization directions. When the first signal is received for the predetermined quantity of times within the predetermined time, it is determined that the polarization direction of the first radar is the first angle. Then the radar signal is transmitted based on the polarization direction of the first radar. The detection direction of the first radar is opposite to the detection direction of the second radar located at the first vehicle, the polarization direction of the second radar is the second angle, and the first angle and the second angle are orthogonal. Because the first angle and the second angle are orthogonal, mutual interference between in-vehicle radars can be effectively reduced.

The determining, based on a first signal, that the polarization direction of the first radar is the first angle may be implemented by using the following two possible implementations:

In a first implementation, it is determined that the polarization direction of the first radar is the first angle, where a quantity of times the first signal is consecutively received by the second radar within the predetermined time is not less than the predetermined quantity of times, and the polarization direction of the first signal is the first angle.

In a second implementation, it is determined that the polarization direction of the first radar is the first angle, where a quantity of times the first signal is consecutively received by the first radar within the predetermined time is not less than the predetermined quantity of times, and the polarization direction of the first signal is the second angle.

Based on the foregoing descriptions, if the heading direction of the first vehicle changes or the first vehicle passes through an intersection, after the determining that a polarization direction of the first radar is a first angle, the method may further include: determining to switch the polarization direction of the first radar to the second angle. Correspondingly, the polarization direction of the second radar is switched to the first angle. Herein, it should be noted that the angles of the polarization directions of the first radar and the second radar always need to be orthogonal.

According to a second aspect, an embodiment provides an apparatus applied to a first radar. The apparatus includes a processing module and a transceiver module. The processing module is configured to determine that a polarization direction of the first radar is a first angle, where the first radar is located at a first vehicle. The transceiver module is configured to transmit a radar signal based on the polarization direction of the first radar. A detection direction of the first radar is opposite to a detection direction of a second radar located at the first vehicle. A polarization direction of the second radar is a second angle. The first angle and the second angle are orthogonal.

Optionally, the first angle is 0 degrees or 90 degrees. Corresponding to the first angle, when the first angle is 0 degrees, the second angle is 90 degrees: or when the first angle is 90 degrees, the second angle is 0 degrees.

In the foregoing embodiment, it is first determined that the polarization direction of the first radar is the first angle, and then the radar signal is transmitted based on the polarization direction of the first radar. The detection direction of the first radar is opposite to the detection direction of the second radar located at the first vehicle, the polarization direction of the second radar is the second angle, and the first angle and the second angle are orthogonal. Because the first angle and the second angle are orthogonal, mutual interference between in-vehicle radars can be effectively reduced.

In a possible implementation, the detection directions of the first radar and the second radar are, respectively, a forward direction and a backward direction of a heading direction of the first vehicle.

Further, the first vehicle further includes a third radar and a fourth radar, and polarization directions of the third radar and the fourth radar are a third angle. Optionally, the third angle is 45 degrees or −45 degrees.

Optionally, detection directions of the third radar and the fourth radar are, respectively, a left direction and a right direction that are orthogonal to the heading direction of the first vehicle.

In another possible implementation, the detection direction of the first radar is a left direction orthogonal to a heading direction of the first vehicle, and the detection direction of the second radar is a right direction orthogonal to the heading direction of the first vehicle: or the detection direction of the first radar is a right direction orthogonal to a heading direction of the first vehicle, and the detection direction of the second radar is a left direction orthogonal to the heading direction of the first vehicle.

In this possible implementation, further, the processing module may be configured to determine, based on a first signal, that the polarization direction of the first radar is the first angle. A quantity of times the first signal is consecutively received within a predetermined time is not less than a predetermined quantity of times, and a polarization direction of the first signal is the first angle or the second angle.

Optionally, the processing module may be further configured to: before determining that the polarization direction of the first radar is the first angle, configure the first radar to alternately transmit a radar signal by using the first angle and the second angle as polarization directions, until the first signal is consecutively received for the predetermined quantity of times within the predetermined time.

In this embodiment, the first radar is first configured to alternately transmit a radar signal by using the first angle and the second angle as the polarization directions. When the first signal is received for the predetermined quantity of times within the predetermined time, it is determined that the polarization direction of the first radar is the first angle. Then the radar signal is transmitted based on the polarization direction of the first radar. The detection direction of the first radar is opposite to the detection direction of the second radar located at the first vehicle, the polarization direction of the second radar is the second angle, and the first angle and the second angle are orthogonal. Because the first angle and the second angle are orthogonal, mutual interference between in-vehicle radars can be effectively reduced.

When the processing module is configured to determine, based on the first signal, that the polarization direction of the first radar is the first angle, the following two possible manners may be used for implementation:

In a first implementation, it is determined that the polarization direction of the first radar is the first angle, where a quantity of times the first signal is consecutively received by the second radar within the predetermined time is not less than the predetermined quantity of times, and the polarization direction of the first signal is the first angle.

In a second implementation, it is determined that the polarization direction of the first radar is the first angle, where a quantity of times the first signal is consecutively received by the first radar within the predetermined time is not less than the predetermined quantity of times, and the polarization direction of the first signal is the second angle.

After it is determined that the polarization direction of the first radar is the first angle, if the heading direction of the first vehicle changes or the first vehicle passes through an intersection, the processing module may be further configured to determine to switch the polarization direction of the first radar to the second angle. Correspondingly, the polarization direction of the second radar is switched to the first angle.

According to a third aspect, an embodiment provides an apparatus applied to a first radar. The apparatus includes a memory and a processor. The memory stores a computer program that can be executed by the processor. When the computer program is executed by the processor, the method according to any one of the first aspect or the possible implementations of the first aspect is implemented.

According to a fourth aspect, an embodiment provides a computer readable storage medium. The computer readable storage medium stores a computer program. The computer program includes at least one segment of code. The at least one segment of code may be executed by a processor, so that a computer implements the method according to any one of the first aspect or the possible implementations of the first aspect.

According to a fifth aspect, an embodiment provides a program. When the program is executed by a computer, the method according to any one of the first aspect or the possible implementations of the first aspect is implemented.

The program may be completely or partially stored in a storage medium that is packaged with a processor, or may be partially or completely stored in a memory that is not packaged with a processor.

Optionally, the processor may be a chip.

According to a sixth aspect, an embodiment provides a computer program product, including a program instruction. The program instruction is used to be executed to implement any one of the foregoing methods.

According to a seventh aspect, an embodiment provides a chip, including a processing module and a communications interface. The processing module cooperates with the communications interface to perform any one of the foregoing methods.

Further, the chip further includes a storage module (for example, a memory). The storage module is configured to store an instruction. The processing module is configured to execute the instruction stored in the storage module, and execute the instruction stored in the storage module, to implement any method in the first aspect.

According to an eighth aspect, an embodiment provides a radar, including a transmit antenna, a receive antenna, and a processor. The processor, the transmit antenna, and the receive antenna cooperate with each other, so that the radar implements the method according to any one of the first aspect or the possible implementations of the first aspect.

Optionally, the radar may further include a memory, configured to store an instruction. The processor is configured to execute the instruction stored in the memory, and the execution of the instruction stored in the memory enables the radar to implement any method in the first aspect.

These and other aspects are described in more detail in descriptions of the following embodiments.

DETAILED DESCRIPTION OF THE EMBODIMENTS

It should be understood that the term "and/or" indicates only an association relationship for describing associated objects, and represents that three relationships may exist. For example, A and/or B may represent the following three cases: only A exists, both A and B exist, and only B exists.

Figure 1:
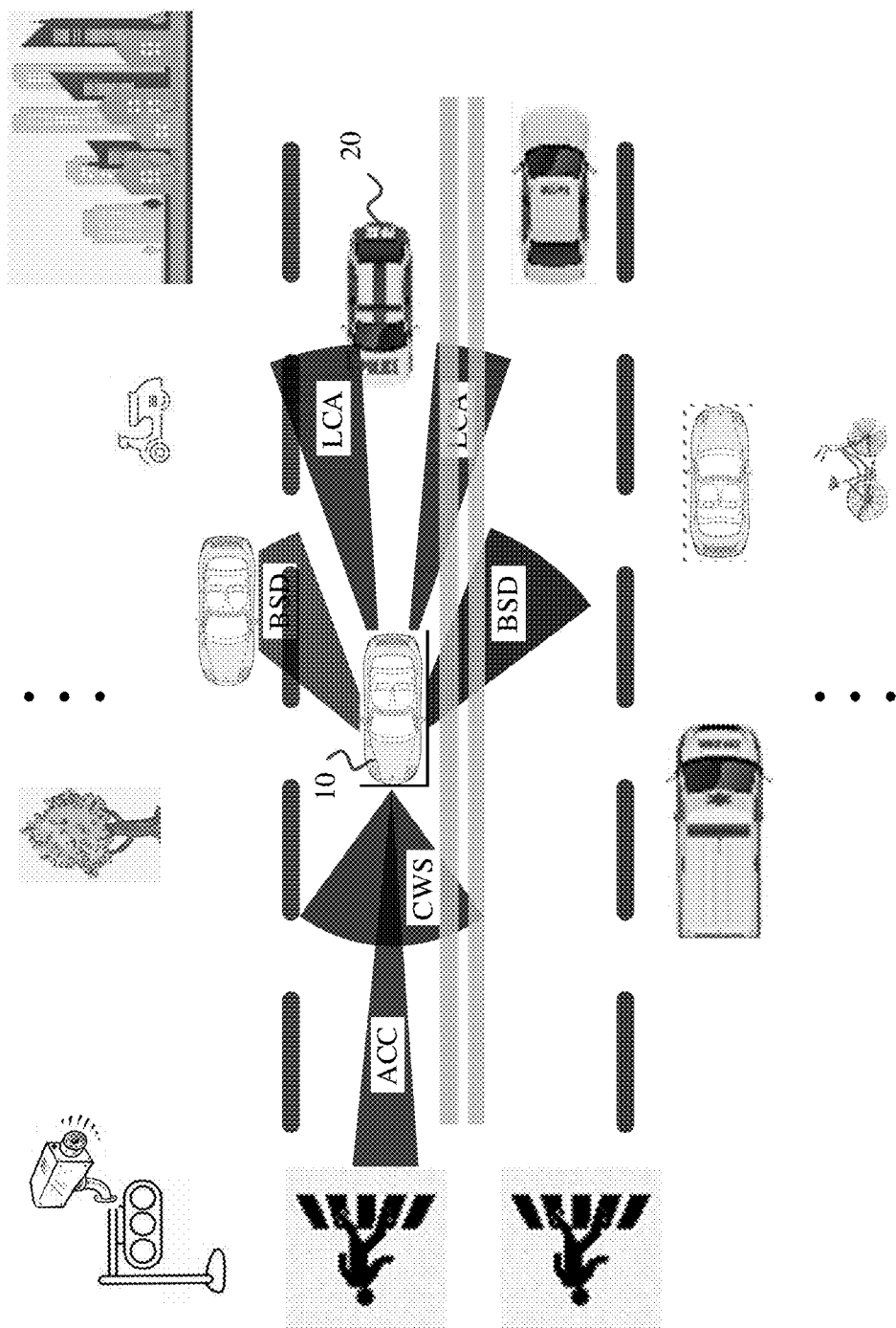
FIG. 1 is a schematic diagram of a case in which a vehicle equipped with an advanced driver assistant system (ADAS) travels on an urban road according to an embodiment.

Embodiments may be applied to a system related to a radar signal, such as an advanced driver assistant system (ADAS). FIG. 1 is a schematic diagram of a case in which a vehicle equipped with an ADAS travels on an urban road according to an embodiment. As shown in FIG. 1, the vehicle equipped with the ADAS may use an in-vehicle radar to detect objects, such as a motor vehicle, a non-motor vehicle, a pedestrian, a building, a tree, and a traffic signal light, around the vehicle. The non-motor vehicle includes, but is not limited to, a bicycle. The motor vehicle includes a motorcycle and the like.

In addition, abbreviations that appear in FIG. 1 are described as follows:

BSD is short for blind spot detection.

LCA is short for lane change assist.

ACC is short for adaptive cruise control.

CWS is short for collision warning system.

Fan-shaped areas marked with these abbreviations are used to represent effective ranges of corresponding functions.

As described above, an objective of the embodiments is to reduce a problem of mutual interference between in-vehicle radars, so that a signal-to-noise ratio at a receiver remains at a specific level, thereby ensuring a detection distance and detection precision of the in-vehicle radar. Mutual interference between in-vehicle radars may be reduced by using a plurality of manners, for example, a polarization method, a time domain method, a frequency domain method, a space domain method, and a code domain method.

The polarization method relates to polarization characteristics of an electromagnetic wave and an antenna. A millimeter wave transmitted by a millimeter-wave radar (that is, a radar signal transmitted by the millimeter-wave radar) and a laser transmitted by a laser radar (that is, a radar signal transmitted by the laser radar) both belong to electromagnetic waves, and are different only in wavelength. An electric field E and a magnetic field H of a plane electromagnetic wave are perpendicular to each other and are perpendicular to a propagation direction of the plane electromagnetic wave.

Figure 2:
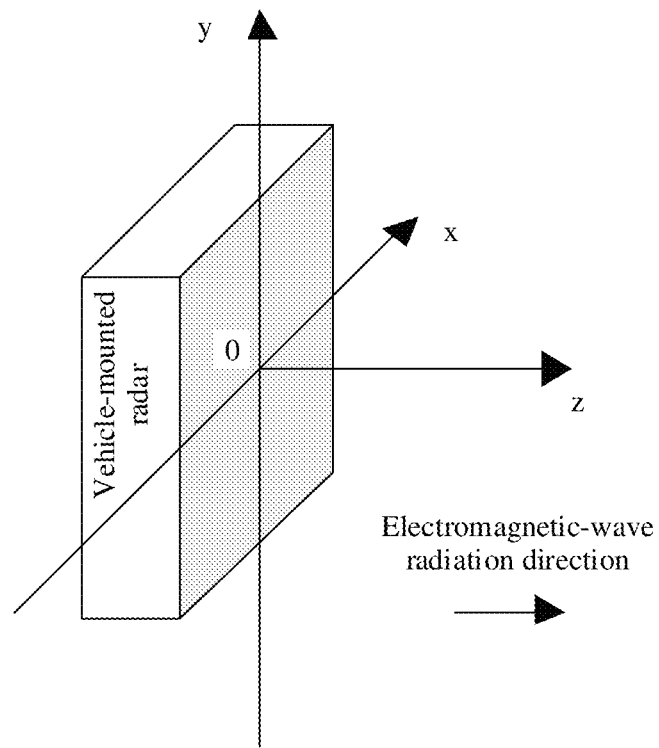
FIG. 2 is a schematic diagram of a local coordinate system of an in-vehicle radar.

For ease of description below, a local coordinate system (LCS) of a concerned in-vehicle radar is first established, as shown in FIG. 2. An electromagnetic-wave radiation direction, that is, a radar signal propagation direction, is a positive direction of a z axis, and electromagnetic-field oscillation occurs in an xoy plane. Unless otherwise specified, angle descriptions below are all provided under a local coordinate system of an in-vehicle radar.

Polarization of an electromagnetic wave is used to describe a direction change of an electric field E/a magnetic field H during propagation of the electromagnetic wave. Generally, the electric field E and the magnetic field H have two components on an equiphase surface. The following uses the electric field E as an example for discussion. It is assumed that the electromagnetic wave is propagated in the positive direction of the z axis.

$$\vec{E} = \vec{e}_x E_x + \vec{e}_y E_y \qquad \text{(Formula 1.1)}$$

Herein, $\vec{e}_x$ and $\vec{e}_y$ are unit vectors in positive directions of an x axis and a y axis, respectively;

$$E_x = E_{xm} \cos\left(\omega\left(t - \frac{z}{c}\right) + \varphi_x\right)$$

and $$E_y = E_{xm} \cos\left(\omega\left(t - \frac{z}{c}\right) + \varphi_y\right)$$

are magnitudes of projected components of an electric field vector $\vec{E}$ on the x axis and the y axis, respectively. $E_{xm}$ and $E_{ym}$ are maximum projection amplitudes of the electric field vector $\vec{E}$ on the x axis and the y axis, respectively. $\varphi_x$ and $\varphi_y$ are, respectively, phases of the two projected components, $\omega$ is an angular frequency of electromagnetic-wave propagation, and c is a speed (the speed of light) of electromagnetic-wave propagation along the z axis.

Polarization refers to a track described by a change of a vector end of the electric field vector $\vec{E}$ over time at a fixed point in space. If the vector end track is a straight line, the electromagnetic wave is referred to as a linearly polarized wave. If the vector end track is circular, the electromagnetic wave is referred to as a circularly polarized wave. If the vector end track is elliptical, the electromagnetic wave is referred to as an elliptically polarized wave. The embodiments relate to only the linearly polarized wave. Therefore, the following provides detailed descriptions of only the linearly polarized wave.

Linearly Polarized Wave:

(1) If $E_x$ and $E_y$ have a same phase, that is, $\varphi_x = \varphi_y = \varphi_0$, then $$E_x = E_{xm} \cos\left(\omega\left(t - \frac{z}{c}\right) + \varphi_x\right)$$

and $$E_y = E_{xm} \cos\left(\omega\left(t - \frac{z}{c}\right) + \varphi_0\right)$$

are satisfied. Assuming that an initial phase satisfies $\varphi_0 = 0$, the following equations are satisfied on an equiphase surface with z=0:

$E_x = E_{sm} \cos \omega t$ $E_y = E_{ym} \cos \omega t$ \hfill (Formula 1.2)

Figure 3:
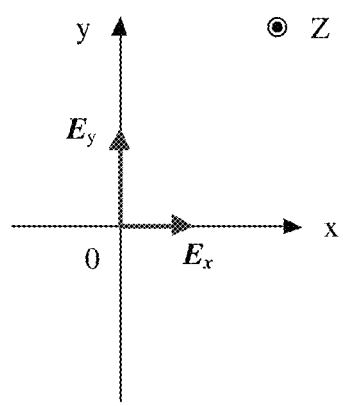
FIG. 3 is a schematic diagram of an electric field component of a linearly polarized wave.

An electric field component of the linearly polarized wave is shown in FIG. 3.

A magnitude of an electric field strength of a synthesized electromagnetic wave is:

$$E = \sqrt{E_x^2 + E_y^2} = \sqrt{E_{xm}^2 + E_{ym}^2} \cos \omega t \qquad \text{(Formula 1.3)}$$

Figure 4:
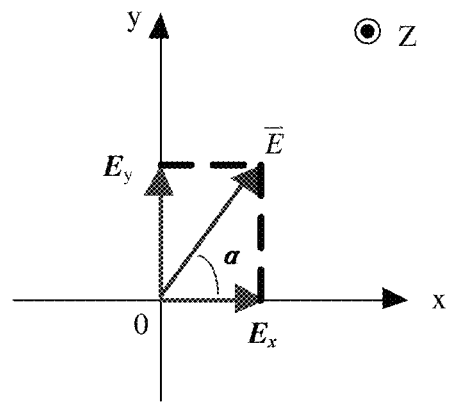
FIG. 4 is a schematic diagram (a first quadrant and a third quadrant) of an electric field component and an electric field vector of a linearly polarized wave.

As shown in FIG. 4, an electric field strength direction of the synthesized electromagnetic wave is represented by an included angle between the electric field vector $\vec{E}$ and the x axis, as follows:

$$\alpha = \text{arctg}\frac{E_y}{E_x} = \text{arctg}\frac{E_{ym}}{E_{xm}} \qquad \text{(Formula 1.4)}$$

In this case, $\alpha$ is a constant greater than 0.

It can be understood that the magnitude of the electric field strength of the synthesized electromagnetic wave sinusoidally varies with time t, and a constant included angle is kept between the electric field direction of the synthesized electromagnetic wave and the x axis, that is, the direction remains unchanged, which indicates that the vector end track of the electric field vector $\vec{E}$ is a straight line. Such an electromagnetic wave is referred to as a linearly polarized wave.

As shown in FIG. 4, if phase amplitudes of $E_x$ and $E_y$ are the same, $E_{xm} = E_{ym}$ is obtained based on (Formula 1.3) and (Formula 1.4). When $\alpha = 45$ degrees, the linearly polarized wave is referred to as a +45-degree linearly polarized wave.

(2) If a phase difference between $E_x$ and $E_y$ is $\pi$, that is, $\varphi_x - \varphi_y = \pi$, assuming that an initial phase satisfies $\varphi_0 = 0$, the following equations are satisfied on an equiphase surface with z=0:

$E_x = E_{xm} \cos \omega t$ $E_y = E_{ym} \cos(\omega t - \pi) = -E_{ym} \cos \omega t$ \hfill (Formula 1.5)

A magnitude of an electric field strength of a synthesized electromagnetic wave is:

$$E = \sqrt{E_x^2 + E_y^2} = \sqrt{E_{xm}^2 + E_{ym}^2} \cos \omega t \qquad \text{(Formula 1.6)}$$

Figure 5:
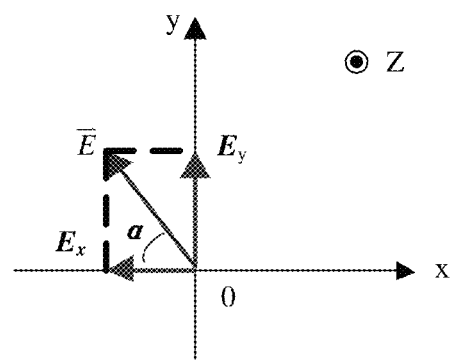
FIG. 5 is another schematic diagram (a second quadrant and a fourth quadrant) of an electric field component and an electric field vector of a linearly polarized wave.

As shown in FIG. 5, an electric field strength direction of the synthesized electromagnetic wave is represented by an included angle between the electric field vector $\vec{E}$ and the x axis, as follows:

$$\alpha = arctg\frac{E_y}{E_x} = -arctg\frac{E_{ym}}{E_{xm}} \quad \text{(Formula 1.7)}$$

In this case, $\alpha$ is a constant less than 0.

As shown in FIG. 5, if $E_x$ and $E_y$ have a phase difference $\pi$ and a same amplitude, $E_{xm}=E_{ym}$ is obtained based on (Formula 1.6) and (Formula 1.7). When $\alpha=-45$ degrees, the linearly polarized wave is referred to as a $-45$-degree linearly polarized wave.

In addition, if the electric field vector $\vec{E}$ of the synthesized electromagnetic wave changes only in an x direction, that is, $\vec{E}=\vec{e}_x E_x$, the linearly polarized wave is referred to as a horizontal linearly polarized wave, which is represented by a 0-degree linearly polarized wave; if the electric field vector $\vec{E}$ of the synthesized electromagnetic wave changes only in a y direction, that is, $\vec{E}=\vec{e}_y E_y$, the linearly polarized wave is referred to as a vertical linearly polarized wave, which is represented by a 90-degree linearly polarized wave.

Based on the foregoing descriptions of electromagnetic-wave polarization, the following provides a concept of antenna polarization. A polarization characteristic of an antenna is defined by a polarization characteristic of an electromagnetic wave radiated by the antenna. For example, if the electromagnetic wave radiated by the antenna is a +45-degree linearly polarized wave, the antenna is referred to as a +45-degree linearly polarized antenna. Usually, a polarization direction may be used to describe a polarization characteristic of a linearly polarized antenna. For example, a +45-degree linearly polarized antenna means that a polarization direction of the antenna is +45 degrees.

When a linearly polarized transceiver antenna transfers an electromagnetic wave, a difference between polarization directions of the antenna and the electromagnetic wave causes a power change of a received signal. Generally, when an angle difference between a polarization direction of a received electromagnetic wave and a polarization direction of a receive antenna is $\phi$, a power loss caused by polarization mismatch is described by a polarization loss factor (PLF):

$$L_{pol}=\cos^2\phi \quad \text{(Formula 1.8)}$$

In this case, $P_{rpl}=P_r \times L_{pol}=P_r \times \cos_2 \phi$, where $P_r$ is a signal power value of the electromagnetic wave arriving at the receive antenna, and $P_{rpl}$ is a signal power value obtained after a receive polarization loss is considered for the receive antenna. In this case, when $\phi=0$ degrees, a received signal has no polarization loss; when $\phi=90$ degrees, a received signal is completely lost due to polarization orthogonality. Therefore, properly configuring a polarization direction of an in-vehicle radar antenna can cancel mutual interference between in-vehicle radars.

In an existing solution for resolving a problem of mutual interference between in-vehicle radars by using polarization characteristics of an electromagnetic wave and an antenna, +45-degree linearly polarized antennas are used as transceiver antennas of all in-vehicle radars of all vehicles. Such a solution leads to design uniformity of in-vehicle radars and cannot adapt to a more flexible scenario. Therefore, a more flexible design manner needs to be provided to reduce mutual interference between in-vehicle radars.

Based on the foregoing descriptions, the embodiments provide a radar signal processing method and an apparatus, and a storage medium, to effectively reduce mutual interference between radar signals between vehicles traveling in a same direction on a same lane, between vehicles traveling in a same direction on different lanes, and between vehicles traveling in opposite directions on different lanes, in a typical unmanned driving scenario.

Figure 6:
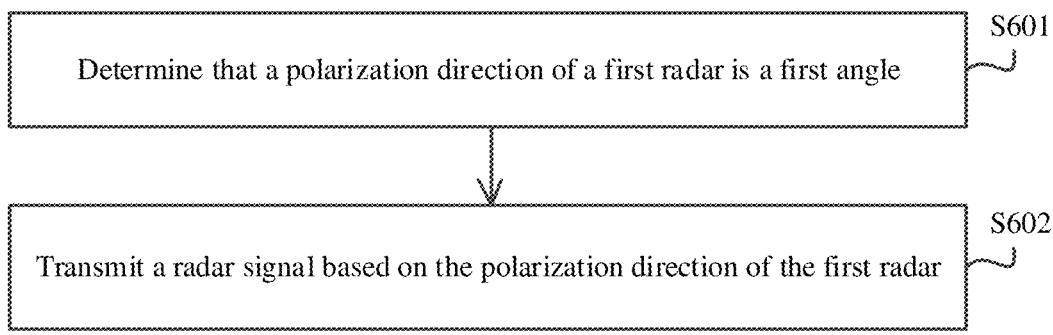
FIG. 6 is a flowchart of a radar signal processing method according to an embodiment.

FIG. 6 is a flowchart of a radar signal processing method according to an embodiment. As shown in FIG. 6, this embodiment provides the radar signal processing method. The method may be performed by a radar signal processing apparatus. The radar signal processing apparatus may be implemented by using software and/or hardware. For example, the radar signal processing apparatus may be an entity configured to receive or transmit a radar signal, for example, an in-vehicle radar. Alternatively, the radar signal processing apparatus may be a control module configured to control at least one in-vehicle radar to receive and send signals. Herein, an example in which a first radar is used as the radar signal processing apparatus is used for description.

As shown in FIG. 6, the radar signal processing method includes the following steps.

S601: Determine that a polarization direction of the first radar is a first angle.

The first radar is located at a first vehicle. Optionally, the first radar may be a radar that performs detection in any direction and that is on the first vehicle. In addition, there may be one first radar or a plurality of first radars. The term "plurality of" includes two or more than two.

A linearly polarized antenna is disposed on the first radar, and the linearly polarized antenna has a polarization direction. For this step, it may be understood that the first radar determines that the polarization direction of the first radar is the first angle. Optionally, the polarization direction of the first radar may be preconfigured to be the first angle. The preconfiguration includes two possible implementations, as follows.

In a first implementation, the first radar is designed to support only the first angle as the polarization direction. That is, a factory-default polarization direction of the first radar is the first angle. Such a first radar cannot implement a polarization direction of another angle. In this embodiment, the first radar may be installed at a corresponding location on the vehicle based on an actual vehicle design and/or related provisions in a traffic plan/laws and regulations, to perform detection in a corresponding direction during driving.

In a second implementation, the first radar is designed to support a plurality of angles as polarization directions. According to the descriptions in this embodiment, the first radar may be installed at any location on the vehicle, and then the polarization direction of the first radar is configured or set to be the first angle based on a direction in which the first radar is designed to perform detection during driving of the vehicle. Further optionally, if a detection direction of the radar needs to be changed, the polarization direction of the first radar may be configured or set anew. Such a design makes the radar more flexible in use and applicable to more scenarios. Herein, it should be noted that the polarization direction of the first radar may change based on a design of the first radar and a requirement of a specific scenario. This is not limited in this embodiment. However, in this embodiment, the determining that a polarization direction of the first radar is a first angle is a configuration for a corresponding detection direction, and usually does not change. In particular, during driving of the first vehicle, the polarization direction of the first radar does not change.

In an optional implementation, the first angle may be 0 degrees or 90 degrees.

S602: Transmit a radar signal based on the polarization direction of the first radar.

An antenna of the first radar may transmit/receive a radar signal, and polarization directions used by the first radar to receive and send radar signals are the same.

Further, the detection direction of the first radar is opposite to a detection direction of a second radar located at the first vehicle. A polarization direction of the second radar is a second angle. The first angle and the second angle are orthogonal. In other words, an angle difference between the first angle and the second angle is 90 degrees.

In a possible implementation, the detection direction of the first radar is a forward direction of a heading direction of the first vehicle, and the detection direction of the second radar is a backward direction of the heading direction of the first vehicle.

In another possible implementation, the detection direction of the first radar is a backward direction of a heading direction of the first vehicle, and the detection direction of the second radar is a forward direction of the heading direction of the first vehicle.

Herein, it should be noted that, that the first angle and the second angle are orthogonal means that angles of the polarization directions are orthogonal. For example, the first angle at which the first radar transmits/receives a radar signal is orthogonal to the second angle at which the second radar transmits/receives a radar signal. For example, when the first angle is 0 degrees, the second angle is 90 degrees; or when the first angle is 90 degrees, the second angle is 0 degrees, or the like.

Still referring to FIG. 1, it is assumed that both a vehicle 10 and a vehicle 20 located on a middle lane may be used as the first vehicle. The first radar is disposed in a forward direction of the vehicle 10, the detection direction of the first radar is the forward direction of the vehicle 10, and the polarization direction of the first radar is the first angle. The second radar is disposed in a backward direction of the vehicle 10, the detection direction of the second radar is the backward direction of the vehicle 10, and the polarization direction of the second radar is the second angle. The first angle and the second angle are orthogonal.

Same as the vehicle 10, the first radar is disposed in a forward direction of the vehicle 20, the detection direction of the first radar is the forward direction of the vehicle 20, and the polarization direction of the first radar is the first angle; the second radar is disposed in a backward direction of the vehicle 20, the detection direction of the second radar is the backward direction of the vehicle 20, and the polarization direction of the second radar is the second angle; the first angle and the second angle are orthogonal.

For the vehicle 10, the vehicle 20 is located on a rear side of the vehicle 10. The polarization direction of the first radar disposed in the forward direction of the vehicle 20 is orthogonal to the polarization direction of the second radar disposed in the backward direction of the vehicle 10. Therefore, the second radar of the vehicle 10 and the first radar of the vehicle 20 do not interfere with each other.

The foregoing uses an example in which the first radar performs detection in the forward direction of the first vehicle and the second radar performs detection in the backward direction of the first vehicle, to describe that radar signals of vehicles traveling in a same direction on a same lane do not interfere with each other.

In this embodiment, it is first determined that the polarization direction of the first radar is the first angle, and then the radar signal is transmitted based on the polarization direction of the first radar. The detection direction of the first radar is opposite to the detection direction of the second radar located at the first vehicle, the polarization direction of the second radar is the second angle, and the first angle and the second angle are orthogonal. Because the first angle and the second angle are orthogonal, mutual interference between in-vehicle radars can be effectively reduced.

Based on the foregoing embodiment, further, the first vehicle may further include a third radar and a fourth radar. Polarization directions of the third radar and the fourth radar are a third angle. Optionally, the third angle is 45 degrees or −45 degrees.

In an optional implementation, detection directions of the third radar and the fourth radar are, respectively, a left direction and a right direction that are orthogonal to the heading direction of the first vehicle. Using this implementation can avoid mutual interference between radar signals between vehicles traveling in a same direction on different lanes and between vehicles traveling in opposite directions on different lanes. Descriptions about non-interference between radar signals are similar to those of the foregoing example, and details are not described herein again. In this case, when the detection directions of the first radar and the second radar are, respectively, the forward direction and backward direction of the heading direction of the first vehicle, the first radar, the second radar, the third radar, and the fourth radar, are, respectively, disposed on the front, the back, the left, and the right of the first vehicle, so that the first vehicle can detect other vehicles in the forward direction and backward direction of the heading direction of the first vehicle and the left direction and right direction that are orthogonal to the heading direction of the first vehicle.

In this embodiment, the in-vehicle radar is configured to detect a signal during driving on a road. For any vehicle, in-vehicle radars configured to perform detection in a same direction have a same polarization direction. The "same direction" herein is relative to a vehicle heading direction, and is used for detection in a forward direction, a backward direction, a left direction, or a right direction. For example, for all vehicles, radars used for detection in a forward direction have a uniform polarization direction, for example, 0 degrees or 90 degrees; and/or radars used for detection in a backward direction have a uniform polarization direction, for example, 90 degrees or 0 degrees. Further, polarization directions of radars used for detection in a left direction and a right direction are the same, and are the same for all vehicles, for example, are all 45 degrees or −45 degrees.

Figure 7:
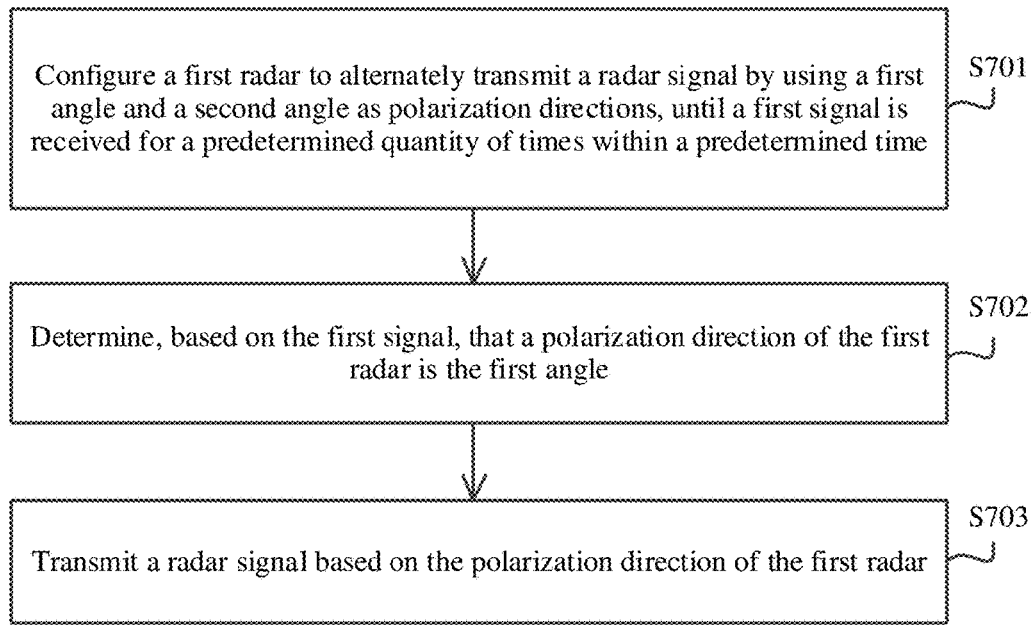
FIG. 7 is a flowchart of a radar signal processing method according to another embodiment.

FIG. 7 is a flowchart of a radar signal processing method according to another embodiment. A difference from the embodiment corresponding to FIG. 6 lies in that, in the embodiment corresponding to FIG. 6, the polarization direction of the first radar does not change during driving and is preconfigured, whereas in this embodiment, the polarization direction of the first radar may change during driving and dynamically changes during driving. Optionally, an initial polarization direction may be configured for the first radar, and is used as a reference during initial startup.

As shown in FIG. 7, the radar signal processing method may include the following steps.

S701: Configure the first radar to alternately transmit a radar signal by using a first angle and a second angle as polarization directions, until a first signal is received for a predetermined quantity of times within a predetermined time.

That the first radar alternately transmits a radar signal by using a first angle and a second angle as polarization directions means that, with a specific time interval as a period, the first radar transmits a radar signal in the first period by using the first angle as the polarization direction; the first radar transmits a radar signal in the second period by using the second angle as the polarization direction; the first radar transmits a radar signal in the third period by using the first angle as the polarization direction; the first radar transmits a radar signal in the fourth period by using the second angle as the polarization direction; and so on.

A quantity of times the first signal is consecutively received within the predetermined time is not less than the predetermined quantity of times. In this embodiment, the preset time and the preset quantity of times may be specified in a standard and/or a traffic plan/regulation, or the preset time and the preset quantity of times may be set based on an actual requirement. This depends on an actual situation.

In an optional implementation, this step may be understood as initialization configuration of a first vehicle after the first vehicle is started.

In another possible implementation, when the first vehicle travels in a place such as a parking lot, the first radar is configured to alternately transmit a radar signal by using the first angle and the second angle as the polarization directions.

In still another possible implementation, when the first vehicle is on an irregular road, the first radar is configured to alternately transmit a radar signal by using the first angle and the second angle as the polarization directions.

When the first signal is received for the predetermined quantity of times within the predetermined time, a radar signal is processed by performing S702 and S703.

Step 702: Determine, based on the first signal, that the polarization direction of the first radar is the first angle.

For example, a detection direction of the first radar is a left direction orthogonal to a heading direction of the first vehicle. If the first radar consecutively receives the first signal whose polarization direction is 0 degrees, the polarization direction of the first radar is 90 degrees. Optionally, a polarization direction of a second radar is 0 degrees. A detection direction of the second radar is a right direction orthogonal to the heading direction of the first vehicle. Optionally, the detection directions of the first radar and the second radar may be interchanged.

For another example, if a second radar consecutively receives the first signal whose polarization direction is 90 degrees, the polarization direction of the first radar is 90 degrees. Optionally, a polarization direction of the second radar is 0 degrees.

Step 703: Transmit a radar signal based on the polarization direction of the first radar.

An antenna of the first radar may transmit/receive a radar signal, and polarization directions used by the first radar to receive and send radar signals are the same.

A quantity of times the first signal is received by the first radar within the predetermined time may include the following several cases:

1. The quantity of times the first signal is consecutively received within the predetermined time is less than the predetermined quantity of times. In this case, the first radar is configured to alternately transmit a radar signal by using the first angle and the second angle as the polarization directions.

2. The quantity of times the first signal is consecutively received within the predetermined time is greater than or equal to the predetermined quantity of times. In this case, it is determined that the polarization direction of the first radar is the first angle, and the radar signal is transmitted based on the polarization direction of the first radar.

The consecutive reception means that only an electromagnetic wave of a fixed angle is received within a period of time. For example, the first signal whose polarization direction is 0 degrees is received for a plurality of times within a period of time, and no signal with any other polarization direction (for example, 90 degrees) is received in this period of time.

In this embodiment, the first radar is first configured to alternately transmit a radar signal by using the first angle and the second angle as the polarization directions. When the first signal is received for the predetermined quantity of times within the predetermined time, it is determined that the polarization direction of the first radar is the first angle. Then the radar signal is transmitted based on the polarization direction of the first radar. The detection direction of the first radar is opposite to the detection direction of the second radar located at the first vehicle, the polarization direction of the second radar is the second angle, and the first angle and the second angle are orthogonal. Because the first angle and the second angle are orthogonal, mutual interference between in-vehicle radars can be effectively reduced.

In an optional implementation, the determining, based on the first signal, that the polarization direction of the first radar is the first angle may include the following two possible implementations, as follows.

In an optional implementation, the determining, based on the first signal, that the polarization direction of the first radar is the first angle may include: determining that the polarization direction of the first radar is the first angle, where a quantity of times the first signal is consecutively received by the second radar within the predetermined time is not less than the predetermined quantity of times, and a polarization direction of the first signal is the first angle.

Herein, the determining based on the first signal may be performed by, for example, a central controller, and be notified to the first radar, and the "determining, based on the first signal, that the polarization direction of the first radar is the first angle" is indirect for the first radar. Thus, the first radar determines that the polarization direction of the first radar is the first angle, the quantity of times the first signal is consecutively received by the second radar within the predetermined time is not less than the predetermined quantity of times, and the polarization direction of the first signal is the first angle.

In another optional implementation, the determining, based on the first signal, that the polarization direction of the first radar is the first angle may include: determining that the polarization direction of the first radar is the first angle, where the quantity of times the first signal is consecutively received by the first radar within the predetermined time is not less than the predetermined quantity of times, and a polarization direction of the first signal is the second angle.

Herein, the determining based on the first signal may be performed by, for example, a central controller, and be notified to the first radar, and the "determining, based on the first signal, that the polarization direction of the first radar is the first angle" is indirect for the first radar. Thus, the first radar determines that the polarization direction of the first radar is the first angle, the quantity of times the first signal is consecutively received by the first radar within the predetermined time is not less than the predetermined quantity of times, and the polarization direction of the first signal is the second angle.

Further, if the heading direction of the first vehicle changes or the first vehicle passes through an intersection, after the determining that the polarization direction of the first radar is the first angle, the radar signal processing method may further include: determining to switch the polarization direction of the first radar to the second angle, and then transmitting, by the first radar, the radar signal based on the second angle. Correspondingly, the polarization direction of the second radar is switched to the first angle. Then the second radar transmits a radar signal based on the first angle.

The heading direction of the first vehicle may change when the first vehicle enters a regular road or the first vehicle is located on a regular lane.

An intersection is a place where roads converge. Optionally, the road is only a roadway. Alternatively, the road may include a roadway and a sidewalk. The intersection may be specifically a crossroads, a T-shaped road junction, a roundabout, or the like.

It should be further noted that all of the first radar, the second radar, the third radar, and the fourth radar that are mentioned in any embodiment are in-vehicle radars. The in-vehicle radar may include at least one of the following radars: a vehicle-side radar, a vehicle-forward radar, and a vehicle-backward radar. The vehicle-side radar includes a left-side radar and a right-side radar.

The following describes the foregoing radar signal processing method by using specific examples, but the examples are not used as a limitation on the protection scope.

Example 1

Figure 8:
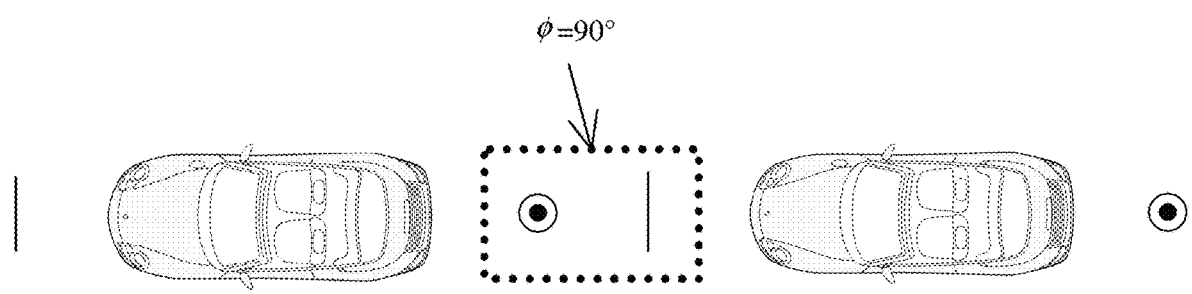
FIG. 8 shows a status of mutual interference between different in-vehicle radars in a scenario of following a vehicle on a same lane.

In this example, that a road is a two-way multi-lane road is used as an example. A 0-degree linearly polarized antenna is used as a transceiver antenna of a first radar whose detection direction is a forward direction of a heading direction of a first vehicle. A 90-degree linearly polarized antenna is used as a transceiver antenna of a second radar whose detection direction is a backward direction of the heading direction of the first vehicle. In a scenario, shown in FIG. 8, of following a vehicle on a same lane, a circle with a black dot represents electromagnetic-wave oscillation perpendicular to the ground, that is, 90-degree linear polarization; a vertical line represents electromagnetic-wave oscillation parallel to the ground, that is, 0-degree linear polarization; and a dotted-line box represents two concerned radars that interfere with each other. It can be understood that an angle difference $\varphi$ between a polarization direction of an interfering radar signal and a polarization direction of a transceiver antenna of the first vehicle is 90 degrees, so that mutual interference can be minimized.

Figure 9:
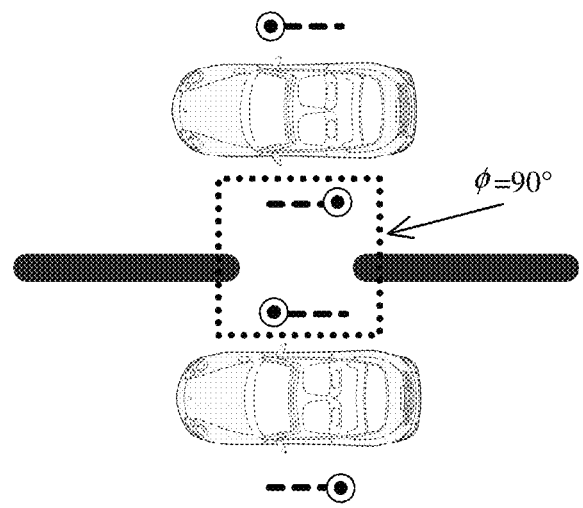
FIG. 9 shows a status of mutual interference between different in-vehicle radars in a scenario of side-by-side driving in a same direction.

A transceiver antenna of a third radar whose detection direction is a left direction orthogonal to the heading direction of the first vehicle and a transceiver antenna of a fourth radar whose detection direction is a right direction orthogonal to the heading direction of the first vehicle are both configured to be +45-degree linearly polarized or −45-degree linearly polarized. For example, when the transceiver antenna of the third radar and the transceiver antenna of the fourth radar are both configured to be +45-degree linearly polarized, as shown in FIG. 9, between two vehicles traveling side by side in a same direction, a circle with a black dot and a dashed line indicates that an electromagnetic wave oscillates on a plane that is perpendicular to the ground and that is parallel to the dashed line, and the circle with the black dot indicates a direction in which oscillation of a linearly polarized wave "warps up". An angle difference $\varphi$ between a polarization direction of an interfering radar signal and a polarization direction of a transceiver antenna of the first vehicle is 90 degrees, so that mutual interference can be minimized.

Figure 10:
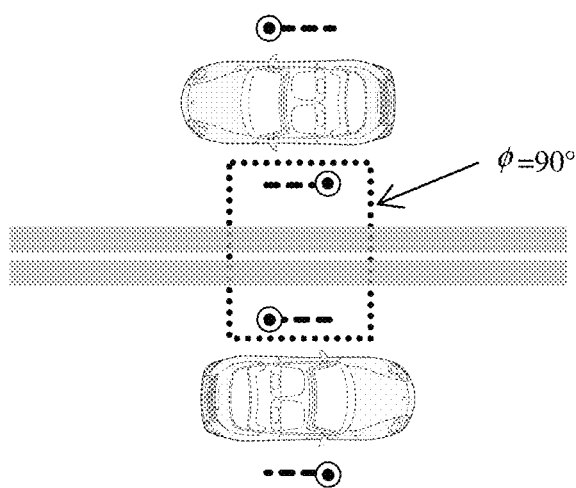
FIG. 10 shows a status of mutual interference between different in-vehicle radars in a scenario of side-by-side driving in opposite directions.

Likewise, between two vehicles traveling side by side in opposite directions, as shown in FIG. 10, an angle difference $\varphi$ between a polarization direction of an interfering radar signal and a polarization direction of a transceiver antenna of the first vehicle is 90 degrees, so that mutual interference can be minimized.

Figure 11:
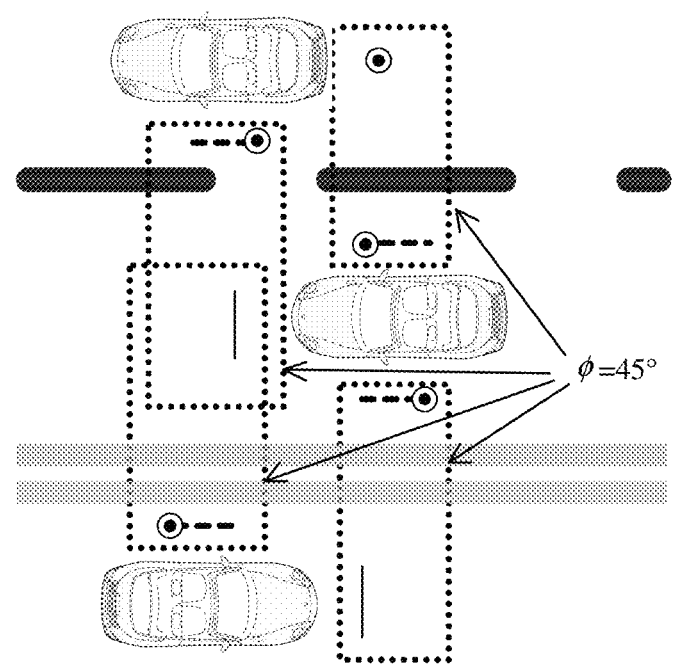
FIG. 11 shows a status of mutual interference between a vehicle-side radar and a vehicle-front/rear radar on different lanes.

In addition, for different lanes, mutual interference between a vehicle-side radar and a vehicle-forward radar or a vehicle-backward radar is shown in FIG. 11. This solution can achieve the following effect; an angle difference $\varphi$ between a polarization direction of an interfering radar signal and a polarization direction of a transceiver antenna of the first vehicle is 45 degrees, so that 3 dB polarization interference cancellation is implemented.

Figure 12:
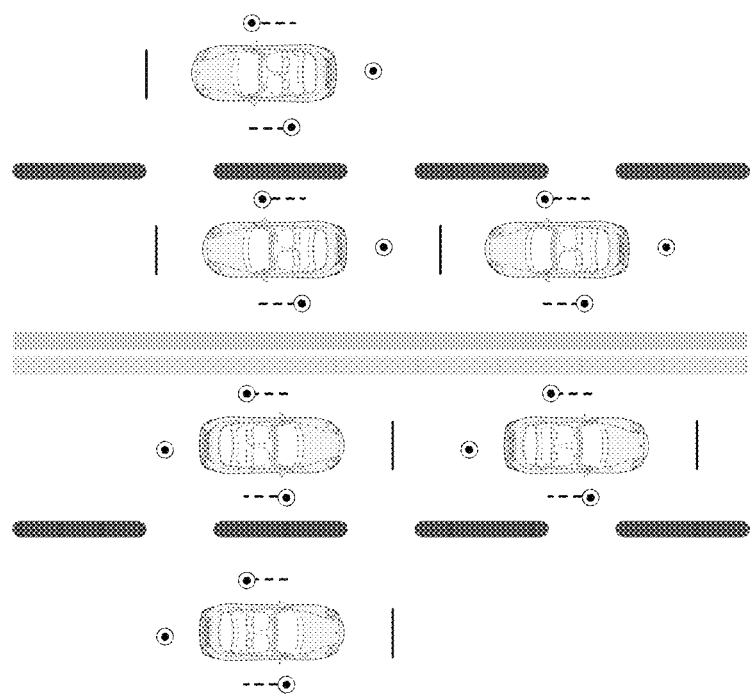
FIG. 12 shows a status of mutual interference between in-vehicle radars on a two-way multi-lane right-driving road.

According to the foregoing radar signal processing method, in a scenario of a two-way multi-lane right-driving road, an effect shown in FIG. 12 can be achieved, for example, mutual interference can be cancelled both between front and rear vehicles and between left and right vehicles that travel side by side. Likewise, the same effect can also be achieved in a scenario of a left-driving road.

As a result, it can be understood from example 1 that, according to the radar signal processing method provided in this embodiment, after a vehicle in a typical unmanned driving scenario properly configures a polarization direction of an in-vehicle radar, mutual interference between in-vehicle radars can be reduced by using the polarization direction without explicit information collaboration.

Moreover, it should be noted that, in any embodiment, a detection direction is not related to a location of a radar on a vehicle. For ease of description, a vehicle-forward radar may be used to represent a radar whose detection direction is a forward direction of a vehicle heading direction, a vehicle-backward radar may be used to represent a radar whose detection direction is a backward direction of a vehicle heading direction, a vehicle-leftward radar represents a radar whose detection direction is a left direction orthogonal to a vehicle heading direction, and a vehicle-rightward radar represents a radar whose detection direction is a right direction orthogonal to a vehicle heading direction.

Example 2

In this example, the road is a right-driving urban road is used as an example. A 0-degree linearly polarized antenna is used as a transceiver antenna of a first radar whose detection direction is a left direction orthogonal to a heading direction of a first vehicle. A 90-degree linearly polarized antenna is used as a transceiver antenna of a second radar whose detection direction is a right direction orthogonal to the heading direction of the first vehicle. A polarization direction of a third radar whose detection direction is a forward direction of the heading direction of the first vehicle is 45 degrees or −45 degrees. A polarization direction of a fourth radar whose detection direction is a backward direction of the heading direction of the first vehicle is 45 degrees or −45 degrees. The polarization directions of the third radar and the fourth radar are the same. When the first vehicle is being started, the first radar is configured to alternately transmit a radar signal by using 0 degrees and 90 degrees as polarization directions, and the second radar is configured to alternately transmit a radar signal by using 90 degrees and 0 degrees as polarization directions.

The first vehicle detects, during driving, a polarization direction of an in-vehicle radar of a nearby vehicle traveling in a same direction. If a first signal is consecutively received by the first radar for a preset quantity of times within a configured preset time (a polarization direction of the first signal is, for example, 0 degrees), it is determined, based on the first signal, that a polarization direction of the first radar is 90 degrees and that a polarization direction of the second radar is 0 degrees.

Figure 13:
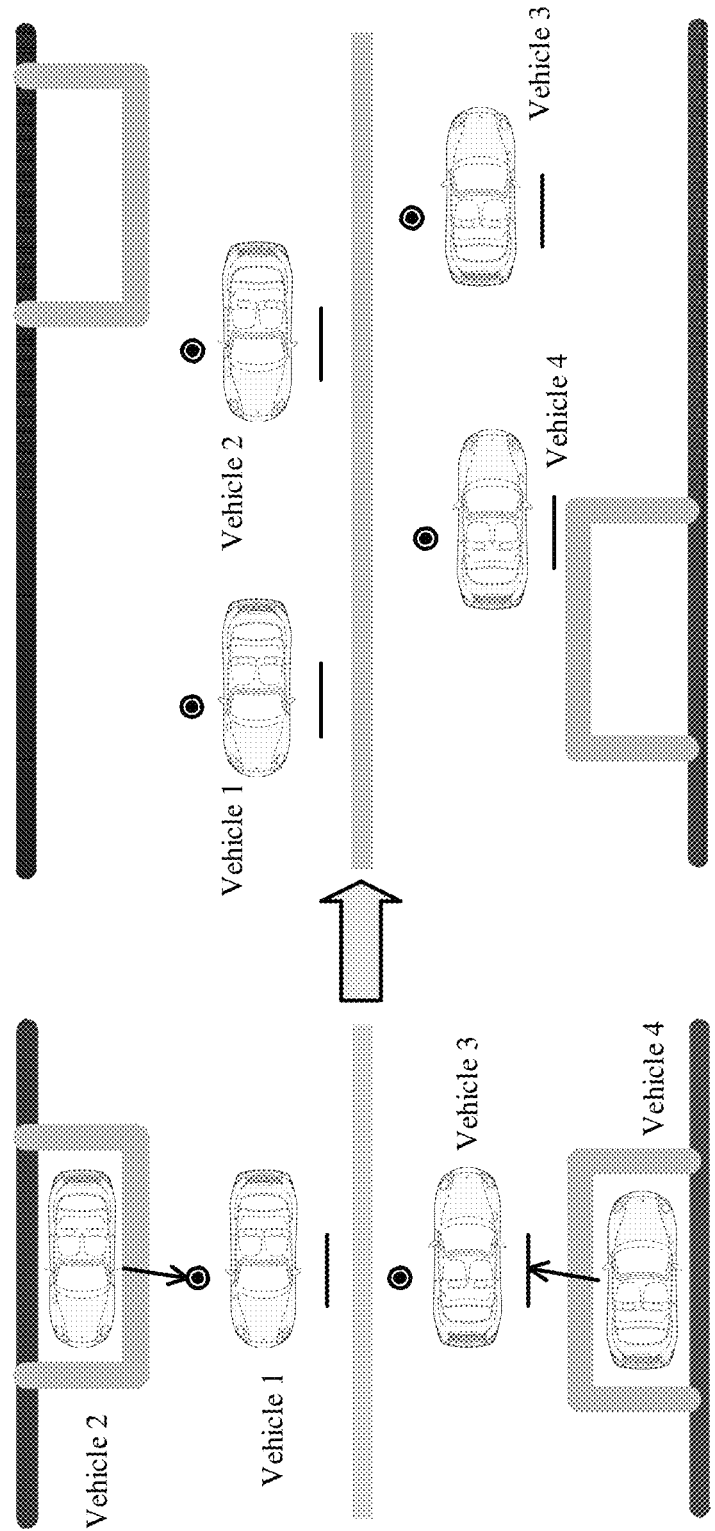
FIG. 13 shows a polarization direction of an in-vehicle radar when a vehicle is started.

As shown in FIG. 13, a vehicle 2 uses a receive antenna of a vehicle-leftward radar to detect a polarization direction of a vehicle-rightward radar of a vehicle (vehicle 1) traveling in a same direction, and adjusts a polarization direction of the vehicle-leftward radar of the vehicle 2. When a received signal reaches a maximum strength, it indicates that the polarization direction of the vehicle-rightward radar of the vehicle 1 is detected. Likewise, a vehicle 4 uses a receive antenna of a vehicle-leftward radar to detect a polarization direction of a vehicle-rightward radar of a vehicle (vehicle 3) traveling in a same direction. In this way, the polarization direction of the vehicle-leftward radar of the vehicle 2 is the same as that of a vehicle-leftward radar of the vehicle 1, and a polarization direction of the vehicle-leftward radar of the vehicle 4 is the same as that of a vehicle-leftward radar of the vehicle 3.

Figure 14:
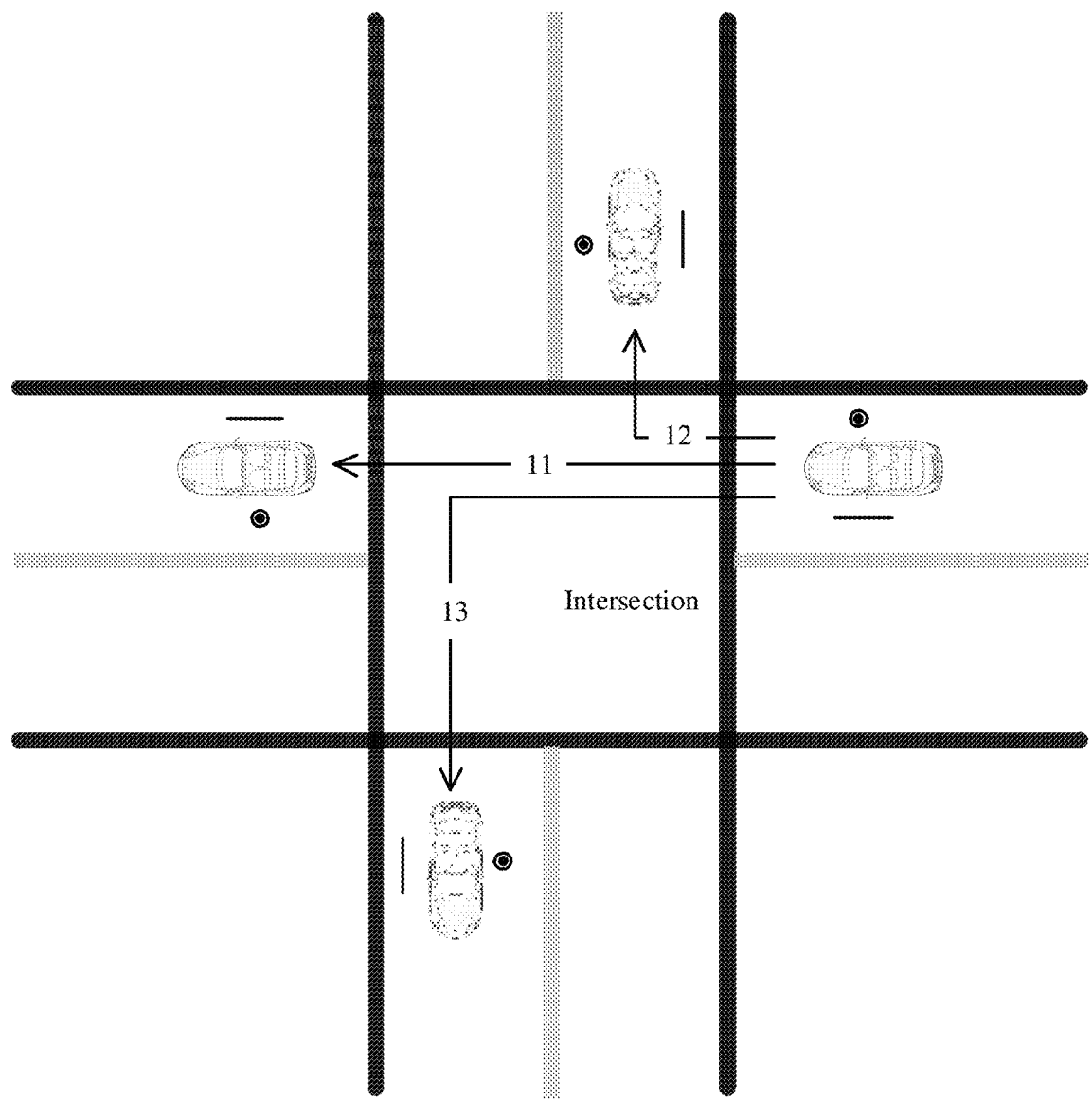
FIG. 14 shows a change status of a polarization direction of an in-vehicle radar when a vehicle passes through an intersection during driving.

During vehicle driving, a polarization direction of an in-vehicle radar remains unchanged provided that a vehicle travels along a lane line, including a case in which the vehicle travels within a lane and a case in which the vehicle switches between lanes. When the vehicle passes through an intersection (such as a crossroads, a T-shaped road junction, or a roundabout), polarization directions of a vehicle-leftward radar and a vehicle-rightward radar are changed. As shown in FIG. 14, when passing through an intersection, a vehicle travels straight along a path 11 to pass through the intersection, turns right along a path 12 to pass through the intersection, or turns left along a path 13 to pass through the intersection. In this case, polarization directions of a vehicle-leftward radar and a vehicle-rightward radar are changed.

Figure 15:
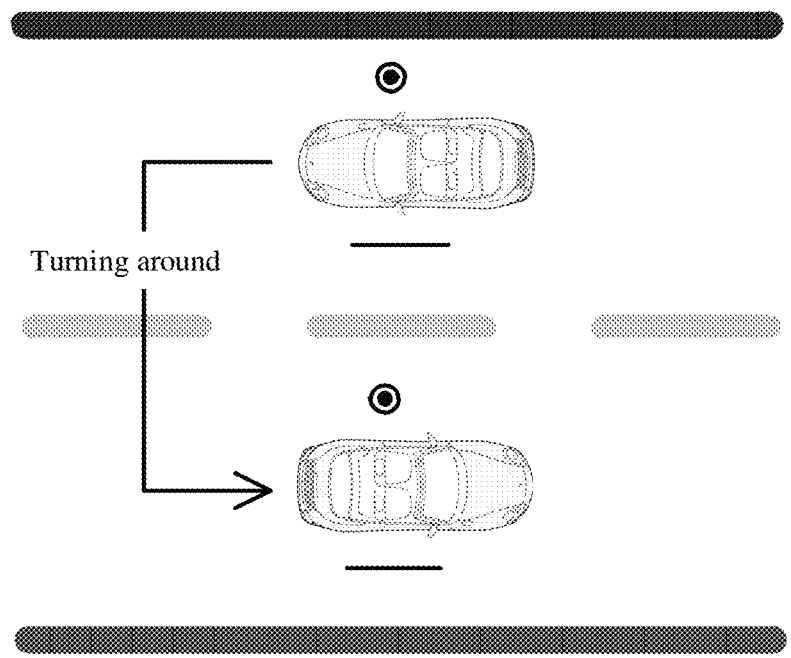
FIG. 15 shows a change status of a polarization direction of an in-vehicle radar when a vehicle turns around.

During vehicle driving, as shown in FIG. 15, when a vehicle turns around, polarization directions of a vehicle-leftward radar and a vehicle-rightward radar are changed.

In the foregoing embodiment, right driving is used as an example for description. A case of left driving is similar, and details are not described herein again.

It can be understood from example 2 that, according to the radar signal processing method provided in this embodiment, a vehicle in an unmanned driving scenario can adjust a polarization direction of a vehicle radar based on different driving behaviors of the vehicle, so that mutual interference between in-vehicle radars can be reduced by using the polarization direction without explicit information collaboration.

The foregoing describes in detail the radar signal processing method provided in the embodiments. The following describes a radar signal processing apparatus provided in the embodiments.

Figure 16:
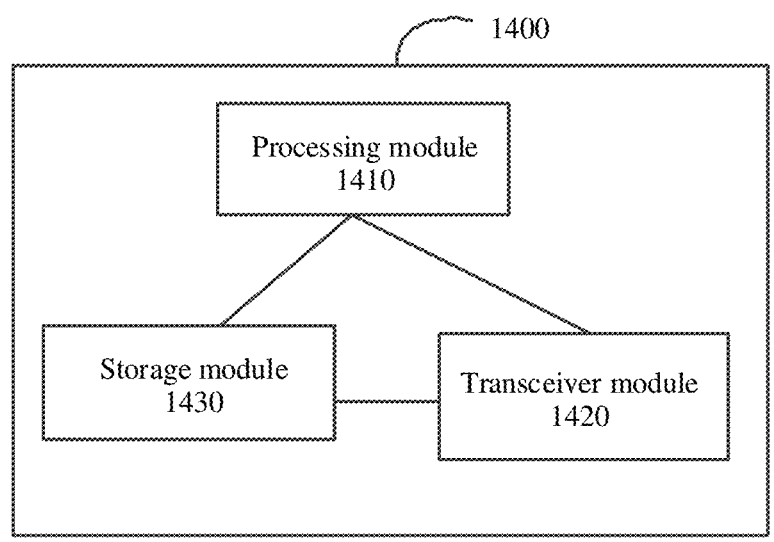
FIG. 16 is a schematic block diagram of a radar signal processing apparatus according to an embodiment.

In an example, FIG. 16 is a schematic block diagram of a radar signal processing apparatus according to an embodiment. The radar signal processing apparatus 1400 in this embodiment may be the first radar in the foregoing method embodiment or may be one or more chips in the first radar. The radar signal processing apparatus 1400 may be configured to perform some or all functions of the first radar in the foregoing method embodiment. The radar signal processing apparatus 1400 may include a processing module 1410 and a transceiver module 1420. Optionally, the radar signal processing apparatus 1400 may further include a storage module 1430.

For example, the processing module 1410 may be configured to perform the step of "determining that a polarization direction of the first radar is a first angle" in the foregoing method embodiment. The transceiver module 1420 may be configured to perform the step of "transmitting a radar signal based on the polarization direction of the first radar" in the foregoing method embodiment.

Alternatively, the radar signal processing apparatus 1400 may be configured as a general-purpose processing system, for example, generally referred to as a chip. The processing module 1410 may include one or more processors that provide a processing function. The transceiver module 1420 may be, for example, an input/output interface, a pin, or a circuit. The input/output interface may be configured to be responsible for information interaction between the chip system and the outside. For example, the input/output interface may output a matching result obtained by the processing module 1410, to another module outside the chip for processing. The processing module 1410 may execute a computer-executable instruction stored in the storage module 1430, to implement a function of the first radar in the foregoing method embodiment. In an example, the optional storage module 1430 included in the radar signal processing apparatus 1400 may be a storage unit in a chip, such as a register or a cache. The storage module 1430 may alternatively be a storage unit that is in the user equipment and that is located outside a chip, such as a read-only memory (ROM) or another type of static storage device that can store static information and an instruction, or a random access memory (RAM).

Figure 17:
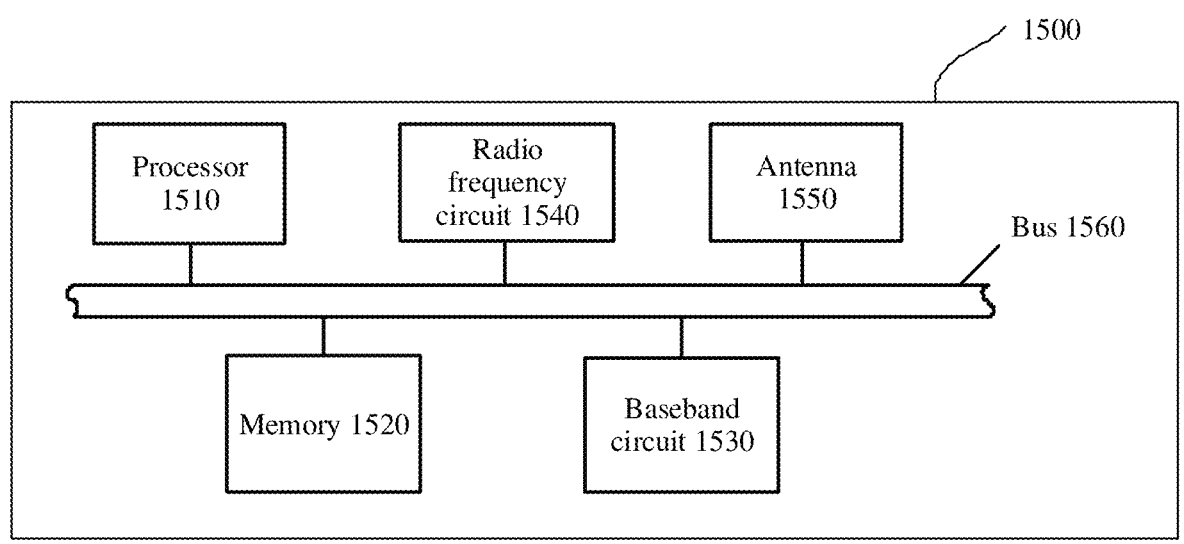
FIG. 17 is a schematic block diagram of a radar signal processing apparatus according to another embodiment.

In another example, FIG. 17 is a schematic block diagram of a radar signal processing apparatus according to another embodiment. The radar signal processing apparatus 1500 in this embodiment may be the first radar in the foregoing method embodiment, and the radar signal processing apparatus 1500 may be configured to perform some or all functions of the first radar in the foregoing method embodiment. The radar signal processing apparatus 1500 may include a processor 1510, a baseband circuit 1530, a radio frequency circuit 1540, and an antenna 1550. Optionally, the radar signal processing apparatus 1500 may further include a memory 1520. Optionally, components of the radar signal processing apparatus 1500 are coupled together by using a bus 1560. In addition to a data bus, a bus system 1560 further includes a power bus, a control bus, and a status signal bus. However, for clear description, various buses in the figure are all marked as the bus system 1560.

The processor 1510 may be configured to control the first radar to perform processing performed by the first radar in the foregoing embodiment, may perform a processing process related to the first radar in the foregoing method embodiment and/or another process used for the technology described herein, and may further run an operating system, be responsible for bus management, and execute a program or an instruction stored in the memory.

The baseband circuit 1530, the radio frequency circuit 1540, and the antenna 1550 may be configured to support information receiving and sending between the first radar and another radar in the foregoing embodiment, to support wireless communication between the first radar and the another radar.

The memory 1520 may be configured to store program code and data of a transmit end, and the memory 1520 may be the storage module 1430 in FIG. 16. It may be understood that the baseband circuit 1530, the radio frequency circuit 1540, and the antenna 1550 may be further configured to support the first radar in communicating with another entity, for example, configured to support the first radar in communicating with another radar. The memory 1520 in FIG. 17 is shown as separated from the processor 1510. However, a person of ordinary skill in the art can easily understand that the memory 1520 or any part of the memory 1520 may be located outside the radar signal processing apparatus 1500. For example, the memory 1520 may include a transmission line and/or a computer product separated from a wireless node. All these media may be accessed by the processor 1510 through a bus interface 1560. Alternatively, the memory 1520 or any part of the memory 1520 may be integrated into the processor 1510, for example, may be a cache and/or a general-purpose register.

It may be understood that FIG. 15 shows only a simplified design of the first radar. For example, in actual application, the first radar may include any quantities of transmitters, receivers, processors, memories, and the like, and all first radars that can implement this application fall within the protection scope of the embodiments.

In a possible implementation, the radar signal processing apparatus may be alternatively implemented by using the following: one or more field-programmable gate arrays (FPGA), a programmable logic device (PLD), a controller, a state machine, gate logic, a discrete hardware component, any other suitable circuit, or any combination of circuits that can perform various functions described in the embodiments.

The processor in the radar signal processing apparatus 1500 may be a general purpose processor, for example, a general-purpose central processing unit (CPU), a network processor (NP), or a microprocessor, or may be an application-specific integrated circuit (ASIC), or one or more integrated circuits configured to control program execution in the solutions. Alternatively, the processor may be a digital signal processor (DSP), a field-programmable gate array (FPGA) or another programmable logic device, a discrete gate or transistor logic device, or a discrete hardware component. The controller/processor may alternatively be a combination for implementing a computing function, for example, a combination including one or more microprocessors, or a combination of a DSP and a microprocessor. The processor usually performs logic and arithmetic operations according to a program instruction stored in the memory.

The memory in the radar signal processing apparatus 1500 may further store an operating system and another application program. For example, the program may include program code, and the program code includes a computer operation instruction. Further, the memory may be a ROM, another type of static storage device that can store static information and an instruction, a RAM, another type of dynamic storage device that can store information and an instruction, a magnetic disk memory, or the like. The memory may be a combination of the foregoing storage types. In addition, the foregoing computer readable storage medium/memory may be in the processor, or may be outside the processor, or may be distributed on a plurality of entities including the processor or a processing circuit. The computer readable storage medium/memory may be specifically embodied in a computer program product. For example, the computer program product may include a computer readable medium in a packaging material.

An embodiment further provides a radar. The radar includes a transceiver antenna and a processor. Optionally, the radar may further include a memory. Further, the transceiver antenna may include a receive antenna and a transmit antenna. The receive antenna and the transmit antenna may be independently disposed, or may be integrated into the transceiver antenna, to perform corresponding receiving and transmitting functions.

The memory may be configured to store program code and data of the radar, and the memory may be the storage module 1430 in FIG. 16. The processor may be configured to execute the program code stored in the memory, to implement the steps in the foregoing method embodiment. For example, the processor may be configured to perform the step of "determining that a polarization direction of the first radar is a first angle" in the foregoing method embodiment, and the transceiver may be configured to perform the step of "transmitting a radar signal based on the polarization direction of the first radar" in the foregoing method embodiment.

Optionally, the radar may be any radar mentioned in the foregoing embodiments.

An embodiment further provides a computer readable storage medium. The computer readable storage medium stores a computer program. The computer program includes at least one segment of code. The at least one segment of code may be executed by a computer, to control the computer to perform the method in any one of the foregoing embodiments.

An embodiment further provides a chip, including a processing module and a communications interface. The processing module can perform a method procedure in any one of the foregoing method embodiments. Further, the chip may further include a storage module (for example, a memory). The storage module is configured to store an instruction. The processing module is configured to execute the instruction stored in the storage module, and the execution of the instruction stored in the storage module enables the processing module to perform a method procedure in any one of the foregoing method embodiments.

An embodiment provides a program or a computer program product including a program instruction. When the program instruction is executed by a processor, the processor is enabled to implement a method procedure in any one of the foregoing method embodiments.

The program instruction may be completely or partially stored in a storage medium that is packaged with the processor, or may be partially or completely stored in a memory that is not packaged with the processor.

Optionally, the processor may be a chip.

In the several embodiments provided, it should be understood that the disclosed system, apparatus, and method may be implemented in other manners. For example, the described apparatus embodiment is merely an example. For example, the division into units is merely logical function division, and may be other division in actual implementation. For example, a plurality of units or components may be combined, or may be integrated into another system, or some features may be ignored or not performed. In addition, the displayed or discussed mutual couplings or direct couplings or communications connections may be implemented by using some interfaces. The indirect couplings or communications connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions in the embodiments.

In addition, functional units in the embodiments may be integrated into one processing unit, or each unit may exist alone physically, or two or more units may be integrated into one unit. The integrated unit may be implemented in a form of hardware, or may be implemented in a form of a software function unit.

What is claimed is:

1. A radar signal processing method, applied to a first radar, the method comprising:
   determining that a polarization direction of the first radar is a first angle, wherein the first radar is located on or in a first vehicle; and
   transmitting a radar signal based on the polarization direction of the first radar, wherein a detection direction of the first radar is opposite to a detection direction of a second radar located at the first vehicle, and a polarization direction of the second radar is a second angle; and
   the first angle and the second angle are orthogonal, determining that the vehicle has turned or determine that the vehicle has passed through the intersection,
   wherein, when a heading direction of the first vehicle changes or the first vehicle passes through an intersection, after determining that the polarization direction of the first radar is a first angle, the method further comprises: determining to switch the polarization direction of the first radar to the second angle, and determining to switch the polarization direction of the second radar to the first angle.

2. The method according to claim 1, wherein
   the detection directions of the first radar and the second radar are, respectively, a forward direction and a backward direction of a heading direction of the first vehicle.

3. The method according to claim 1, wherein
   the first vehicle further comprises a third radar and a fourth radar, and polarization directions of the third radar and the fourth radar are a third angle.

4. The method according to claim 3, wherein
   detection directions of the third radar and the fourth radar are, respectively, a left direction and a right direction that are orthogonal to the heading direction of the first vehicle.

5. The method according to claim 1, wherein
   the detection direction of the first radar is a left direction orthogonal to a heading direction of the first vehicle, and the detection direction of the second radar is a right direction orthogonal to the heading direction of the first vehicle; or
   the detection direction of the first radar is a right direction orthogonal to a heading direction of the first vehicle, and the detection direction of the second radar is a left direction orthogonal to the heading direction of the first vehicle.

6. The method according to claim 5, wherein the determining that a polarization direction of the first radar is a first angle comprises:
   determining, based on a first signal, that the polarization direction of the first radar is the first angle, wherein
   a quantity of times the first signal is consecutively received within a predetermined time is not less than a predetermined quantity of times, and a polarization direction of the first signal is the first angle or the second angle.

7. The method according to claim 6, wherein before the determining that a polarization direction of the first radar is a first angle, the method further comprises:
   configuring the first radar to alternately transmit a radar signal by using the first angle and the second angle as polarization directions, until the first signal is consecutively received for the predetermined quantity of times within the predetermined time.

8. The method according to claim 6, wherein the determining, based on the first signal, that the polarization direction of the first radar is the first angle comprises:
   determining that the polarization direction of the first radar is the first angle, wherein a quantity of times the first signal is consecutively received by the second radar within the predetermined time is not less than the predetermined quantity of times, and the polarization direction of the first signal is the first angle; or
   determining that the polarization direction of the first radar is the first angle, wherein a quantity of times the first signal is consecutively received by the first radar within the predetermined time is not less than the predetermined quantity of times, and the polarization direction of the first signal is the second angle.

9. The method according to claim 5, wherein
   when a heading direction of the first vehicle changes or the first vehicle passes through an intersection, after the determining that a polarization direction of the first radar is a first angle, the method further comprises: determining to switch the polarization direction of the first radar to the second angle.

10. The method according to claim 1, wherein
    the first angle is 0 degrees or 90 degrees.

11. The method according to claim 3, wherein
    the third angle is 45 degrees or −45 degrees.

12. A radar signal processing apparatus, comprising:
    one or more processors, and
    a non-transitory storage medium in communication with the one or more processors, the non-transitory storage medium configured to store program instructions, wherein, when executed by the one or more processors, the instructions cause the apparatus to:
    determine that a polarization direction of a first radar is a first angle, wherein the first radar is located on or in a first vehicle; and
    transmit a radar signal based on the polarization direction of the first radar, wherein
    a detection direction of the first radar is opposite to a detection direction of a second radar located at the first vehicle, and a polarization direction of the second radar is a second angle; and
    the first angle and the second angle are orthogonal, determining that the vehicle has turned or determine that the vehicle has passed through the intersection,
    wherein when a heading direction of the first vehicle changes or the first vehicle passes through an intersection, after determining that the polarization direction of the first radar is a first angle, the instructions further cause the apparatus to: determine to switch the polarization direction of the first radar to the second angle, and determine to switch the polarization direction of the second radar to the first angle.

13. The radar signal processing apparatus according to claim 12, wherein
    the detection directions of the first radar and the second radar are, respectively, a forward direction and a backward direction of a heading direction of the first vehicle.

14. The radar signal processing apparatus according to claim 12, wherein
the first vehicle further comprises a third radar and a fourth radar, and polarization directions of the third radar and the fourth radar are a third angle.

15. The radar signal processing apparatus according to claim 14, wherein
detection directions of the third radar and the fourth radar are, respectively, a left direction and a right direction that are orthogonal to the heading direction of the first vehicle.

16. The radar signal processing apparatus according to claim 12, wherein
the detection direction of the first radar is a left direction orthogonal to a heading direction of the first vehicle, and the detection direction of the second radar is a right direction orthogonal to the heading direction of the first vehicle; or
the detection direction of the first radar is a right direction orthogonal to a heading direction of the first vehicle, and the detection direction of the second radar is a left direction orthogonal to the heading direction of the first vehicle.

17. The radar signal processing apparatus according to claim 16, wherein the instructions further cause the apparatus to:
determine, based on a first signal, that the polarization direction of the first radar is the first angle, wherein
a quantity of times the first signal is consecutively received within a predetermined time is not less than a predetermined quantity of times, and a polarization direction of the first signal is the first angle or the second angle.

18. The radar signal processing apparatus according to claim 17, wherein the instructions further cause the apparatus to:
before determining that the polarization direction of the first radar is the first angle, configure the first radar to alternately transmit a radar signal by using the first angle and the second angle as polarization directions, until the first signal is consecutively received for the predetermined quantity of times within the predetermined time.

19. The radar signal processing apparatus according to claim 12, wherein
the first angle is 0 degrees or 90 degrees.

20. A vehicle, comprising:
a processor configured to determine that a polarization direction of a first radar is a first angle, wherein the first radar is located on or in a first vehicle; and
a transmitter configured to transmit a radar signal based on the polarization direction of the first radar, wherein
a detection direction of the first radar is opposite to a detection direction of a second radar located at the first vehicle, and a polarization direction of the second radar is a second angle; and
the first angle and the second angle are orthogonal, determining that the vehicle has turned or determine that the vehicle has passed through the intersection,
wherein when a heading direction of the first vehicle changes or the first vehicle passes through an intersection, after determining that the polarization direction of the first radar is a first angle, the processor further determines to switch the polarization direction of the first radar to the second angle, and determines to switch the polarization direction of the second radar to the first angle.

* * * * *